(No Model.)
J. M. GREIST.
SEWING MACHINE ATTACHMENT HOLDER.
No. 587,258. Patented July 27, 1897.
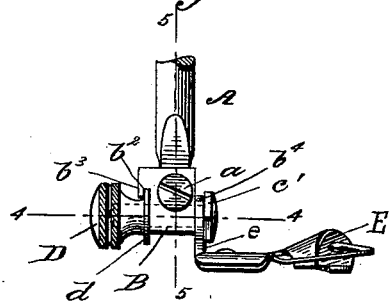
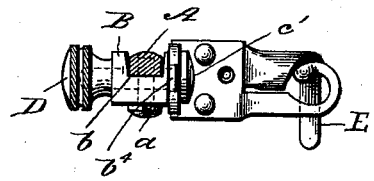
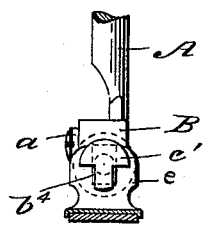
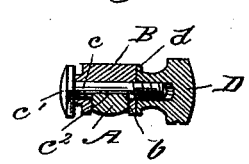
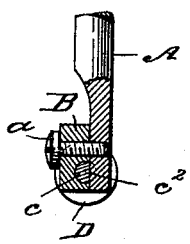
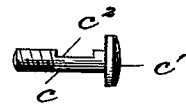
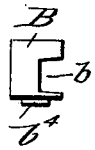
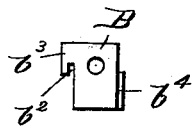
Witnesses:
C. M. Sweeney
H. A. Cushman
Inventor:
John M. Greist
by Henry Calver
Attorney.

UNITED STATES PATENT OFFICE.

JOHN M. GREIST, OF NEW HAVEN, CONNECTICUT.

SEWING-MACHINE-ATTACHMENT HOLDER.

SPECIFICATION forming part of Letters Patent No. 587,258, dated July 27, 1897.

Application filed December 30, 1896. Serial No. 617,499. (No model.)

*To all whom it may concern:*

Be it known that I, JOHN M. GREIST, a citizen of the United States, residing at New Haven, in the county of New Haven and State of Connecticut, have invented certain new and useful Improvements in Sewing-Machine-Attachment Holders, of which the following is a specification, reference being had therein to the accompanying drawings.

My invention has for its object to provide a simple and convenient sewing-machine-attachment holder by means of which a hemmer or other attachment may be readily and conveniently applied in operative position relative to the needle of the machine or quickly and easily removed to give place to another attachment.

In carrying my invention into effect I provide a small bracket, which is removably attached to the lower end of the attachment-holding bar, said bar being preferably the ordinary presser-bar of a sewing-machine. The said bracket is provided with a groove or seat to receive a reduced portion of the bar and has also extending through it a hole at right angles to said groove or seat, and which hole cuts into or partly intersects the said groove or seat. In the hole referred to is inserted a bolt, provided with a clamping-head and having at its end opposite the said head a screw-threaded portion for the reception of a nut. The said nut is provided with a flange, and the said bracket has a projection with an undercut groove, into which groove said flange can extend in such a manner that while the nut may be readily turned endwise movement of said nut will be prevented, and thus the turning of said nut will cause endwise movement of the clamping-bolt. The bracket is preferably provided beneath the head of the clamping-bolt with a thin lug which is to be embraced by a fork or shank of the attachment, said lug having a thickness slightly less than the arms of the fork, so that the pressure of the head of the clamping-bolt will be received by said arms. To prevent rotation of the clamping-bolt with the nut, the former is provided with a flattened portion abutting against the portion of the attachment-holding bar extending into the groove or seat of the bracket, and which groove or seat partly intersects the hole in said bracket which receives said bolt, and as said flattened portion of said bolt is of a length only slightly greater than the width of the said groove or seat the movement of the bolt under the influence of the nut when the clamping-head of the bolt is to be released will be limited so long as the bracket is secured to the bar which supports it. The endwise movement of the said bolt by said nut being thus limited it will be impossible for the bolt to get out of place, and it can only be removed by detaching the bracket from the bar.

In the accompanying drawings, Figure 1 is a side view illustrating my improved attachment-holder with a presser-foot hemmer held thereby. Fig. 2 is a plan view of the same with the attachment-holding bar in section. Fig. 3 is a front end view of the same with the presser-foot hemmer in vertical section. Figs. 4 and 5 are detail sections on lines 4 4 and 5 5, respectively, of Fig. 1. Fig. 6 is a detail view of the bolt, and Figs. 7 and 8 are detail views of the bracket.

A denotes an attachment-holding bar, which is preferably the ordinary presser-bar of the machine. To the said bar A is secured, by a set-screw $a$, the bracket B, having a groove or seat $b$ for the reception of the reduced lower part of said bar A. The bracket B has extending through it, in a direction transverse to the groove or seat $b$, a hole which slightly intersects the said groove or seat and which receives the clamping-bolt $c$, provided with the head $c'$ and with the flattened portion $c^2$ at that part of said bolt which comes opposite said groove or seat $b$, so that the said flattened portion can bear against the reduced part of the bar A and thereby prevent rotation of the said bolt.

D denotes a nut which screws onto the threaded rear end of the bolt $c$, the said nut being provided with a small annular flange $d$, which extends into a small undercut groove $b^2$, formed beneath a projection $b^3$ of the bracket B, so that when the said nut is turned endwise movement thereof will be prevented and endwise movement of the bolt C will consequently be induced. The bracket B is provided beneath the head $c'$ of the bolt $c$ with a thin lug or projection $b^4$, which is to be embraced by the arms of the shank $e$ of the attachment E, the attachment herein shown being an ordinary presser-foot hemmer. The said lug $b^4$ is of a thickness slightly less than the thickness of said arms, so that when the nut D is turned in the proper direction and the head $c'$ of the bolt $c$ is drawn inward by said nut the clamping force of the said head will be exerted against said arms of the attachment, while the said lug will serve to steady the attachment in place.

To facilitate the application of or removal of the attachment from the holder, the lower part of the clamping-head $c'$ of the bolt $c$ is preferably cut away on both sides, as shown in Fig. 3, so that the bifurcated shank of the attachment can be applied to the holder without requiring the attachment-holding bar to be lifted but slightly from working position, in which the attachment will rest on the work or on the throat-plate of the machine.

Inasmuch as the flattened portion $c^2$ of the bolt $c$ is of a length only a little greater than the width of the reduced portion of the bar A, which fits in the groove or seat $b$ of the bracket B, it will be impossible when the said bracket is in operative position for the said bolt to move except to a limited extent when the nut D is turned, and it will thus be impossible for the said bolt to get out of place, and it can only be removed from the bracket B by detaching said bracket from the bar A. The flattened portion $c^2$ of the bolt $c$, fitting against the reduced portion of the bar A, prevents rotation of the said bolt with the nut D, as will be understood.

From the foregoing it will be seen that in the use of my invention an attachment may be readily applied in operative position and may then be readily and securely held in place simply by the partial rotation of the nut D to draw the clamping-head $c'$ of the bolt $c$ against the arms of the bracket of the attachment, and it will also be understood that the attachment may readily be loosened when it is to be removed by a partial releasing rotation of the nut D.

As I have shown my attachment-holding device as being applied to the presser-bar of a machine, it will be understood that an ordinary presser-foot may be held in place thereby or may be substituted for the presser-foot hemmer herein shown, and it will also be apparent that any other kind of attachment may be secured in place by my improved holding device instead of the hemmer attachment herein shown.

Having thus described my invention, I claim and desire to secure by Letters Patent—

1. A sewing-machine-attachment holder consisting of the combination with a bar, as A, of a bracket, as B, removably secured to said bar, and provided with a groove or seat, as $b$, for the reception of a portion of said bar, said bracket having through it a hole transverse to said groove or seat, combined with a bolt, as $c$, having a head, as $c'$, and having at its end opposite said head a screw-threaded portion, a nut, as D, applied to said threaded portion of said bolt, and means for preventing endwise movement of said nut when it is turned, and thereby causing an endwise movement of said bolt in the bracket.

2. An attachment-holding device consisting of the combination with a bar A, of the bracket B provided with the groove or seat $b$ and with the undercut groove $b^2$, said bracket having through it a hole transverse to said groove or seat $b$ and slightly intersecting the latter, the bolt $c$ fitted in said hole and having the clamping-head $c'$, the flattened portion $c^2$ and a threaded portion at its end opposite said head, and the nut D having the flange $d$ extending into said undercut groove $b^2$.

In testimony whereof I affix my signature in presence of two witnesses.

JOHN M. GREIST.

Witnesses:
 THOMAS B. GOLE,
 P. RAYMOND GREIST.